United States Patent
Miyashita (10) Patent No.: US 10,802,799 B2
(45) Date of Patent: Oct. 13, 2020

(54) SEMICONDUCTOR DEVICE HAVING PLURAL OPERATION CIRCUITS INCLUDING MULTIPLIER AND ACCUMULATOR

(71) Applicant: Toshiba Memory Corporation, Minato-ku, Tokyo (JP)

(72) Inventor: Daisuke Miyashita, Kawasaki Kanagawa (JP)

(73) Assignee: Toshiba Memory Corporation, Tokyo (JP)

(*) Notice: Subject to any disclaimer, the term of this patent is extended or adjusted under 35 U.S.C. 154(b) by 94 days.

(21) Appl. No.: 16/124,903

(22) Filed: Sep. 7, 2018

(65) Prior Publication Data

US 2019/0294414 A1    Sep. 26, 2019

(30) Foreign Application Priority Data

Mar. 22, 2018  (JP) .................................. 2018-054284

(51) Int. Cl.
*G06F 7/544* (2006.01)
*G06F 17/16* (2006.01)

(52) U.S. Cl.
CPC ............ *G06F 7/5443* (2013.01); *G06F 17/16* (2013.01)

(58) Field of Classification Search
None
See application file for complete search history.

(56) References Cited

U.S. PATENT DOCUMENTS 5,014,235 A    5/1991  Morton
5,121,352 A *  6/1992  Hesson ................. G06F 7/5443
                                                708/625

(Continued)

FOREIGN PATENT DOCUMENTS

| JP | H06-502937 A | 3/1994 |
| JP | 2006-139864 A | 6/2006 |
| JP | 2007-128651 A | 5/2007 |

OTHER PUBLICATIONS

M. Courbariaux, et al., "Binarized Neural Networks: Training Neural Networks with Weights and Activations Constrained to +1 or —1", Cornel University Library, arXiv: 1602.02830, 2016, http://arxiv.org/abs/1602.02830.

(Continued)

*Primary Examiner* — Michael D. Yaary
(74) *Attorney, Agent, or Firm* — White & Case LLP (57) ABSTRACT

According to an embodiment, there is provided a semiconductor device including a plurality of operation circuits each including a multiplier including a first input terminal and a second input terminal and configured to calculate a product of a value input via the first input terminal and a value input via the second input terminal, and an accumulator configured to integrate an output of the multiplier and output an integrated value that is obtained by integrating output values of the multiplier. The plurality of operation circuits are divided into groups by two manners, where by the first manner multiple operation circuits are configured to receive a common first value via the respective first input terminals, and by the second manner multiple operation circuits are configured to receive a common second value via the respective second input terminals.

12 Claims, 9 Drawing Sheets

(56) References Cited

U.S. PATENT DOCUMENTS

| | | | | |
|---|---|---|---|---|
| 6,029,187 | A * | 2/2000 | Verbauwhede | G06F 7/607 |
| | | | | 708/625 |
| 6,609,236 | B2 | 8/2003 | Watanabe et al. | |
| 7,746,109 | B1 * | 6/2010 | Young | G06F 7/5324 |
| | | | | 326/38 |
| 7,813,171 | B2 | 10/2010 | Shibata et al. | |
| 7,840,630 | B2 * | 11/2010 | Wong | G06F 7/02 |
| | | | | 708/708 |
| 7,849,119 | B2 * | 12/2010 | Vadi | G06F 7/02 |
| | | | | 708/212 |

OTHER PUBLICATIONS

H. Sharma, et al., "Bit Fusion: Bit-Level Dynamically Composable Architecture for Accelerating Deep Neural Networks", 45th International Symposium on Computer Architecture (ISCA), 2018, http://arxiv.org/abs/1712.01507.

* cited by examiner

$$y_{m,r} = \sum_{t=0}^{T-1} w_{m,t} \times x_{t,r} \quad \cdots \quad (1)$$

FIG. 8

$$y = \sum_{t=0}^{T-1} w_t \times x_t$$

$$= \sum_{t=0}^{T-1} \left\{ \left( w_t^{(2)} 2^2 + w_t^{(1)} 2^1 + w_t^{(0)} 2^0 \right) \times \left( x_t^{(2)} 2^2 + x_t^{(1)} 2^1 + x_t^{(0)} 2^0 \right) \right\}$$

$$= \left\{ \sum_{t=0}^{T-1} w_t^{(2)} x_t^{(2)} \right\} \times 2^4 + \left\{ \sum_{t=0}^{T-1} w_t^{(2)} x_t^{(1)} \right\} \times 2^3 + \left\{ \sum_{t=0}^{T-1} w_t^{(2)} x_t^{(0)} \right\} \times 2^2$$

$$+ \left\{ \sum_{t=0}^{T-1} w_t^{(1)} x_t^{(2)} \right\} \times 2^3 + \left\{ \sum_{t=0}^{T-1} w_t^{(1)} x_t^{(1)} \right\} \times 2^2 + \left\{ \sum_{t=0}^{T-1} w_t^{(1)} x_t^{(0)} \right\} \times 2^1$$

$$+ \left\{ \sum_{t=0}^{T-1} w_t^{(0)} x_t^{(2)} \right\} \times 2^2 + \left\{ \sum_{t=0}^{T-1} w_t^{(0)} x_t^{(1)} \right\} \times 2^1 + \left\{ \sum_{t=0}^{T-1} w_t^{(0)} x_t^{(0)} \right\} \times 2^0$$

$$\cdots (5)$$

FIG. 9

$$y = \sum_{t=0}^{T-1} w_t \times x_t$$

$$= \sum_{t=0}^{T-1} \left\{ \left(-w_t^{(2)}2^2 + w_t^{(1)}2^1 + w_t^{(0)}2^0\right) \times \left(-x_t^{(2)}2^2 + x_t^{(1)}2^1 + x_t^{(0)}2^0\right) \right\}$$

$$= \left\{\sum_{t=0}^{T-1} w_t^{(2)}x_t^{(2)}\right\} \times 2^4 - \left\{\sum_{t=0}^{T-1} w_t^{(2)}x_t^{(1)}\right\} \times 2^3 - \left\{\sum_{t=0}^{T-1} w_t^{(2)}x_t^{(0)}\right\} \times 2^2$$

$$- \left\{\sum_{t=0}^{T-1} w_t^{(1)}x_t^{(2)}\right\} \times 2^3 + \left\{\sum_{t=0}^{T-1} w_t^{(1)}x_t^{(1)}\right\} \times 2^2 + \left\{\sum_{t=0}^{T-1} w_t^{(1)}x_t^{(0)}\right\} \times 2^1$$

$$- \left\{\sum_{t=0}^{T-1} w_t^{(0)}x_t^{(2)}\right\} \times 2^2 + \left\{\sum_{t=0}^{T-1} w_t^{(0)}x_t^{(1)}\right\} \times 2^1 + \left\{\sum_{t=0}^{T-1} w_t^{(0)}x_t^{(0)}\right\} \times 2^0$$

$$\cdots (5')$$

F I G. 10

SEMICONDUCTOR DEVICE HAVING PLURAL OPERATION CIRCUITS INCLUDING MULTIPLIER AND ACCUMULATOR

CROSS-REFERENCE TO RELATED APPLICATIONS

This application is based upon and claims the benefit of priority from Japanese Patent Application No. 2018-054284, filed on Mar. 22, 2018, the entire contents of which are incorporated herein by reference.

FIELD

Embodiments described herein relate generally to a semiconductor device.

BACKGROUND

A semiconductor device performing matrix-matrix multiplications (hereinafter, "matrix product calculations") is already known about. A matrix product calculation is a basic arithmetic operation that constitutes the essentials in digital signal processing, e.g., image processing. A major part of calculating operations in deep neural networks also adopts matrix product calculations. The accuracy required of the matrix product calculations in deep neural networks may be low when compared to matrix product calculations in other instances. The accuracy required of the matrix product calculations also varies in the processing within a deep neural network depending on the situations in which they are applied.

For example, it is already known that the accuracy required of the matrix product calculation for inferring is lower than that for learning (or training). Besides, even in the same type of inferring behaviors, the required accuracy may differ depending on the layers of a deep neural network. The required accuracy within the same layer could often differ as well, depending on arithmetic operations.

On the other hand, a matrix product calculation proceeds through the combination of multiplications and additions which are independent of one another, and as such, a matrix product calculation can be easily parallelized. Therefore, parallel processing by multiple arithmetic operators would be one effective option for the improvement of efficiency including reduction of power, acceleration of calculation speeds, and so on.

BRIEF DESCRIPTION OF THE DRAWINGS

FIGS. 5A and 5B are diagrams showing how input data are related to arithmetic operators.

FIG. 6 is a diagram showing an LUT.

DETAILED DESCRIPTION

According to an embodiment, there is provided a semiconductor device comprising a plurality of operation circuits each comprising a multiplier including a first input terminal and a second input terminal and configured to calculate a product of a value input via the first input terminal and a value input via the second input terminal, and an accumulator configured to integrate an output of the multiplier and output an integrated value that is obtained by integrating output values of the multiplier. The plurality of operation circuits are divided into groups by two manners, where by the first manner multiple operation circuits in each of the groups are configured to receive a common first value via the respective first input terminals, and by the second manner multiple operation circuits in each of the groups are configured to receive a common second value via the respective second input terminals.

Embodiments will be described with reference to the drawings.

1 Configuration of Semiconductor Device

Figure 1:
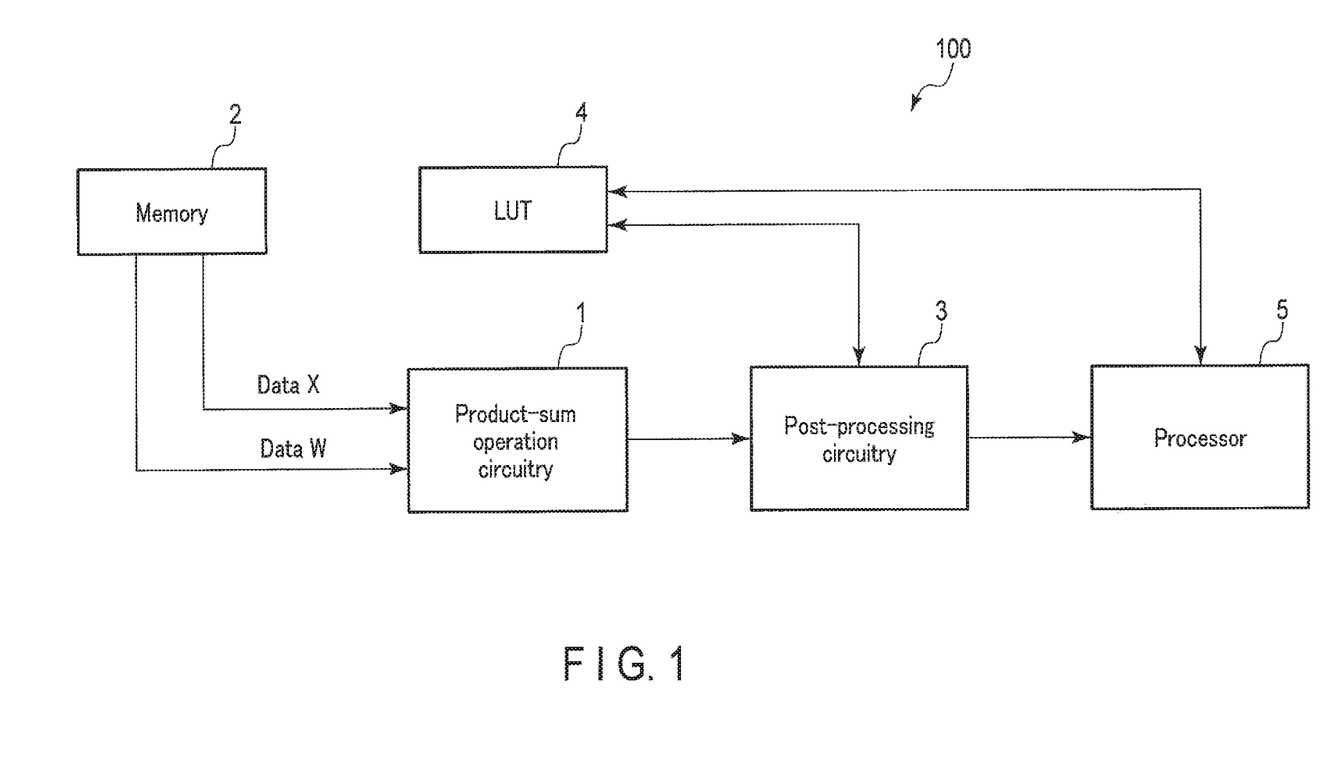
FIG. 1 is a diagram showing a semiconductor device according to a an embodiment.

FIG. 1 shows a semiconductor device 100 according to one embodiment.

As shown in FIG. 1, the semiconductor device 100 includes product-sum operation circuitry 1 to which a memory 2 and post-processing circuitry 3 are coupled. Two data items (data X and W) stored in the memory 2 are input to the product-sum operation circuitry 1.

The data X is expressed in a matrix form with t rows and r columns, and the data W is expressed in a matrix form with m rows and t columns (t, r, and m each being 0 or a positive integer). The embodiment will assume t to be time (read cycle).

The two matrices will be given as:

$$W = \{w_{m,t}\}_{0 \leq m \leq M-1,\ 0 \leq t \leq T-1},\text{ and}$$

$$X = \{x_{t,r}\}_{0 \leq t \leq T-1,\ 0 \leq r \leq R-1},$$

where T-1 is the maximum value of read cycles, R-1 is the maximum column number of the matrix of the data X, and M-1 is the maximum row number of the matrix of the data W.

The product-sum operation circuitry 1 performs a matrix operation using the two data items (W, X) input from the memory 2, and outputs the operation result to the post-processing circuitry 3. More specifically, the product-sum operation circuitry 1 includes a plurality of arithmetic operators arranged in an array and each including a multiplier and an accumulator.

Figure 8:
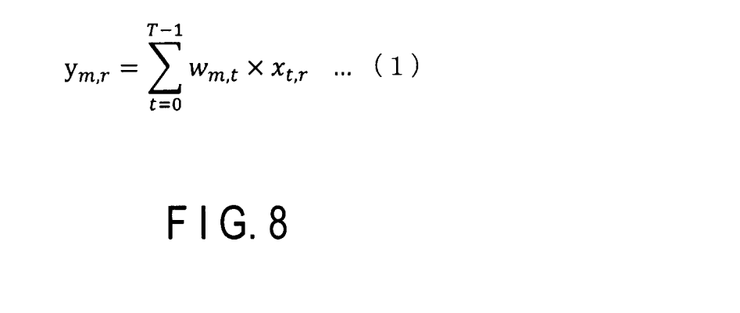
FIG. 8 is an expression calculated by the product-sum operation circuitry.

Assuming that a matrix to be calculated is Y=WX, the operation for each element of $Y = \{y_{m,r}\}_{0 \leq m \leq M-1,\ 0 \leq r \leq R-1}$ takes a product-sum form as an expression (1) shown in FIG. 8.

The product-sum operation circuitry 1 accordingly outputs the result of the product-sum operation to the post-processing circuitry 3.

The memory 2 may have any configuration as long as it is a semiconductor memory, such as an SRAM, a DRAM, an SDRAM, a NAND flash memory, a three-dimensionally designed flash memory, an MRAM, a register, a latch circuit, or the like.

The post-processing circuitry 3 performs an operation to the output from the product-sum operation circuitry 1, which includes the output of each arithmetic operator at time T-1 corresponding to an m-th row and an r-th column, using a particular coefficient settable to each arithmetic operator. The post-processing circuitry 3 then puts an output index to the operation result and outputs it to a processor 5. In these actions, the post-processing circuitry 3 acquires the particular coefficient and the output index from a lookup table (LUT) 4 as necessary.

If the post-processing is not required, the post-processing circuitry 3 may be omitted, and the output from the product-sum operation circuitry 1 may be supplied to the processor 5.

The LUT 4 stores the particular coefficients and the output indexes for the respective arithmetic operators in the product-sum operation circuitry 1. The LUT 4 may be storage circuitry.

The processor 5 receives results of the product-sum operations of the respective arithmetic operators after the processing by the post-processing circuitry 3. The processor 5 is capable of setting the particular coefficients and the output indexes to be stored into the LUT 4 and set to the respective arithmetic operators.

2 Configuration of Product-Sum Operation Circuitry 1 and Operations of Semiconductor Device 2-1 First Exemplary Product-Sum Operation Circuitry (Product-Sum Operation Circuitry without Bit Limitations)

Figure 2:
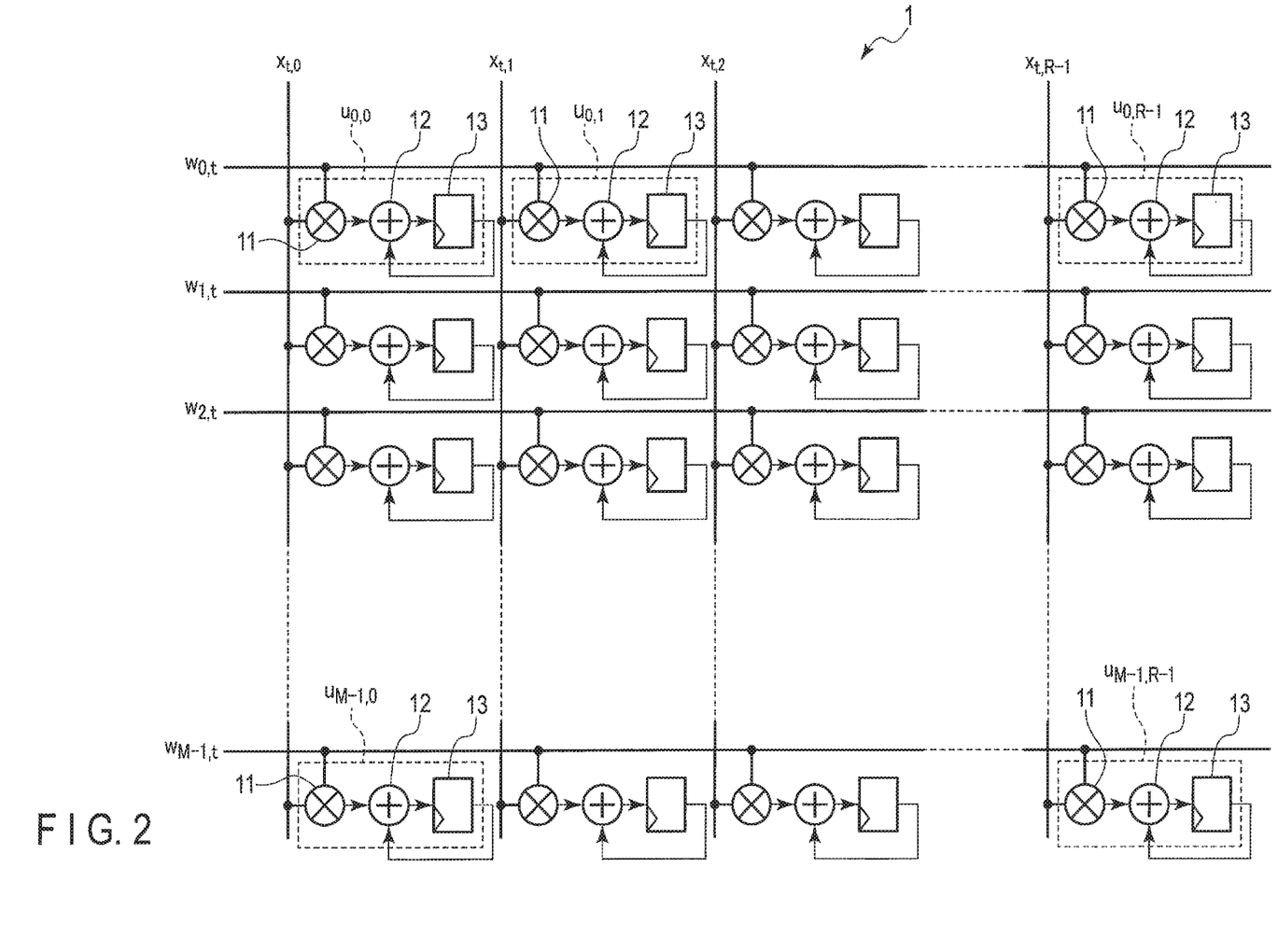
FIG. 2 is a diagram showing first exemplary product-sum operation circuitry for the semiconductor device according to the embodiment.

FIG. 2 shows first exemplary product-sum operation circuitry 1 for the semiconductor device 100 according to the embodiment.

As shown in FIG. 2, M×R arithmetic operators $u_{0,0}$ to $u_{M-1,R-1}$ are arrayed in parallel. An "arithmetic operator $u_{m,r}$" refers to the arithmetic operator positioned at the m-th row and the r-th column. The arithmetic operators $u_{0,0}$ to $u_{M-1,R-1}$ each include a multiplier 11, an adder 12, and a register 13.

The multiplier 11 in each of the arithmetic operators $u_{0,0}$ to $u_{M-1,R-1}$ includes a first input terminal and a second input terminal. The first input terminal of the multiplier 11 in an arithmetic operator $u_{m,r}$ is coupled to a data line that is common to the other arithmetic operators arranged on the m-th row, and the second input terminal is coupled to a data line that is common to the other arithmetic operators arranged on the r-th column.

In other words, first inputs which are supplied to the first input terminals of certain multipliers 11 (among all the arithmetic operators $u_{m,r}$) share a data line for data $w_{m,t}$ in the row direction, and second inputs which are supplied to the second input terminals of certain multipliers 11 share a data line for data $x_{t,r}$ in the column direction.

As such, at time t, the first inputs to the multipliers 11 in the arithmetic operators $u_{0,0}, u_{0,1}, \ldots, u_{0,R-1}$ share a value of data $w_{0,t}$, the first inputs to the multipliers 11 in the arithmetic operators $u_{1,0}, u_{1,1}, \ldots, u_{1,R-1}$ share a value of data $w_{1,t}$, and so forth, so that the first inputs to the multipliers 11 in the arithmetic operators $u_{M-1,0}, u_{M-1,1}, \ldots, u_{M-1,R-1}$ share a value of data $w_{M-1,t}$.

Similarly, at the time t, the second inputs to the multipliers 11 in the arithmetic operators $u_{0,0}, u_{1,0}, \ldots, u_{M-1,0}$ share a value of data $x_{t,0}$, the second inputs to the multipliers 11 in the arithmetic operators $u_{0,1}, u_{1,1}, \ldots, u_{M-1,1}$ share a value of data $x_{t,1}$, and so forth, so that the second inputs to the multipliers 11 in the arithmetic operators $u_{0,R-1}, u_{1,R-1}, \ldots, u_{M-1,R-1}$ share a value of data $x_{t,R-1}$.

The multiplier 11 in each of the arithmetic operators $u_{0,0}$ to $u_{M-1,R-1}$ multiplies data of the first input by data of the second input, and outputs the multiplication result to the adder 12.

Accordingly, the multipliers 11 in the arithmetic operators $u_{0,0}, u_{0,1}, \ldots, u_{0,R-1}$ at the time t output the respective multiplication results (i.e. the results of multiplying the data $w_{0,t}$ of the first input by the data $x_{t,0}, x_{t,1}, \ldots, x_{t,R-1}$ of the second input, respectively).

Also, the multipliers 11 in the arithmetic operators $u_{0,0}, u_{1,0}, \ldots, u_{M-1,0}$ at the time t output the respective multiplication results (i.e. the results of multiplying the data $x_{t,0}$ of the second input by the data $w_{0,t}, w_{1,t}, \ldots, w_{M-1,t}$ of the first input, respectively).

The adder 12 and the register 13 in each of the arithmetic operators $u_{0,0}$ to $u_{M-1,R-1}$ constitute an accumulator. In each of the arithmetic operators $u_{0,0}$ to $u_{M-1,R-1}$, the adder 12 adds together the multiplication result given from the multiplier 11 and the value at time t-1 (one cycle prior to the time t) that the register 13 is holding (value of the accumulator).

The register 13 holds the time t-1 multiplication result given via the adder 12, and retains the addition result output from the adder 12 at the cycle of time t.

Namely, the accumulator in each of the arithmetic operators $u_{0,0}$ to $u_{M-1,R-1}$ is configured to integrate an output of the multiplier 11 and output an integrated value that is obtained by integrating output values of the multiplier 11.

In this manner, M×R arithmetic operators are arrayed in parallel, and at time t, data $w_{m,t}$ is input to the r arithmetic operators arranged on the m-th row and data $x_{t,r}$ is input to the m arithmetic operators arranged on the r-th column. Accordingly, at the time t, the arithmetic operator at the m-th row and the r-th column performs the calculation expressed as:

$$y_{m,r,t} = y_{m,r,t-1} + w_{m,t} \times x_{t,r} \quad (2)$$

where, $y_{m,r,t}$ represents the value newly stored at the time t in the register 13 in the arithmetic operator $u_{m,r}$. Consequently, the arithmetic operations according to the expression (1) are finished by T cycles. That is, the determinant Y=W×X can be calculated by the M×R arithmetic operators each calculating $y_{m,r}$ over the T cycles.

The time t value in the register 13 in each arithmetic operator $u_{m,r}$ is output to the post-processing circuitry 3. Note that the output from each arithmetic operator $u_{m,r}$ in the first exemplary product-sum operation circuitry 1 is supplied to the processor 5 without post-processing.

In other words, the plurality of arithmetic operators $u_{0,0}$ to $u_{M-1,R-1}$ (operation circuits) are divided into two groups by two manners. By the first manner, multiple operation circuits in each of the groups ($u_{0,0}$ to $u_{0,R-1}$, $u_{1,0}$ to $u_{1,R-1}$, ..., $u_{M-1,0}$ to $u_{M-1,R-1}$) are configured to receive a common first value via the respective first input terminals. By the second manner, multiple operation circuits in each of the groups ($u_{0,0}$ to $u_{M-1,0}$, $u_{0,1}$ to $u_{M-1,1}$, ..., $u_{0,R-1}$ to $u_{M-1,R-1}$) are configured to receive a common second value via the respective second input terminals.

2-2 Second Exemplary Product-Sum Operation Circuitry (Product-Sum Operation Circuitry 1a Adopting 1-Bit Multipliers 11)

Figure 3:
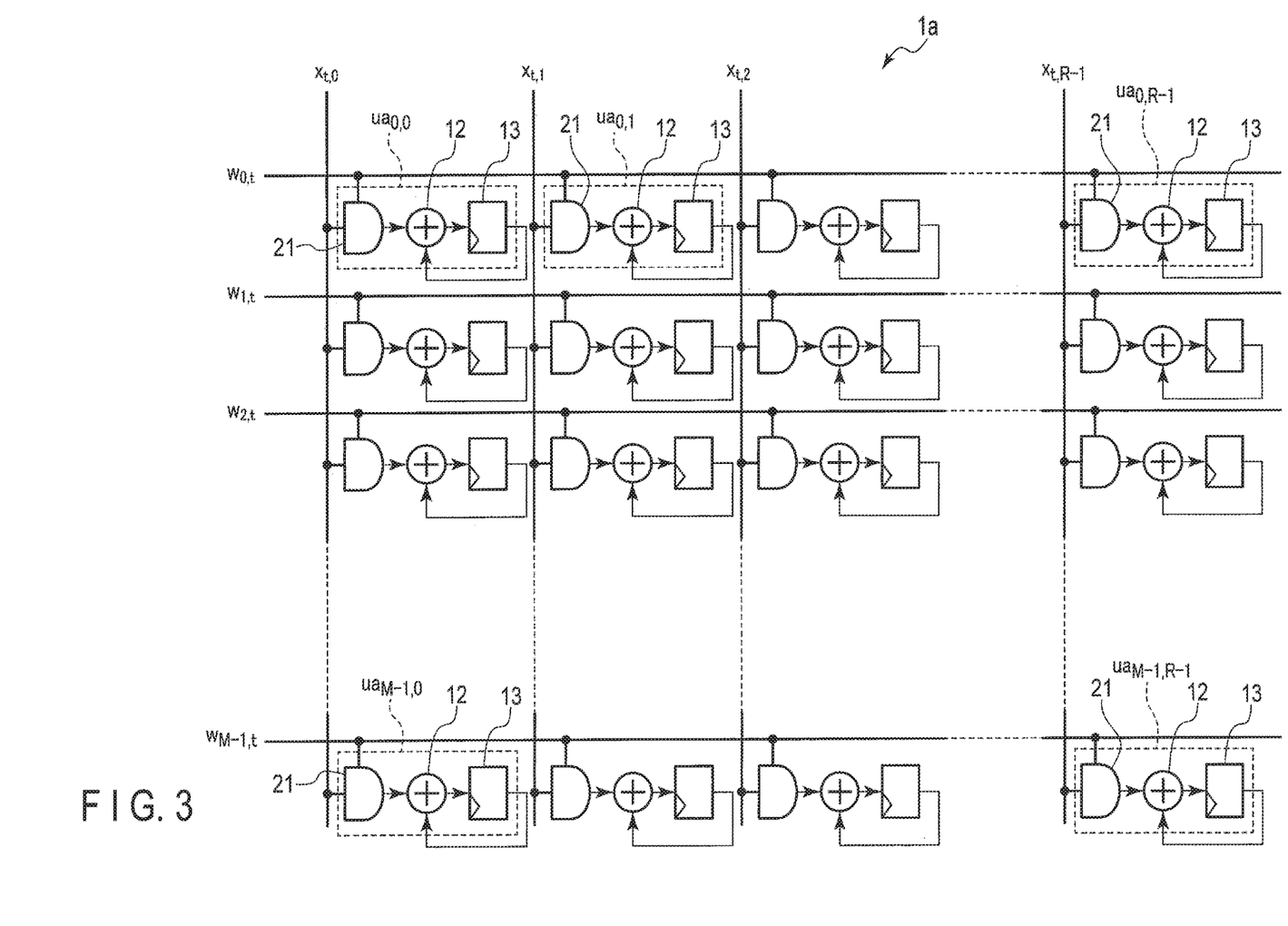
FIG. 3 is a diagram showing second exemplary product-sum operation circuitry for the semiconductor device according to the embodiment.

FIG. 3 shows second exemplary product-sum operation circuitry 1a for the semiconductor device 100 according to the embodiment. It embraces the case where the multipliers 11 are 1-bit multipliers.

In the example shown by FIG. 3, the multipliers 11 of FIG. 2 are replaced by 1-bit multipliers. A 1-bit multiplier serves the purpose provided that it can perform four types of calculations, i.e., 0×0=0, 0×1=0, 1×0=0, and 1×1=1. This is exactly the two-input AND logic itself. In the second exemplary product-sum operation circuitry 1*a*, the multiplier in each arithmetic operator ua$_{m,r}$ uses an AND logic gate 21.

In FIG. 3, the AND logic gate 21 in each arithmetic operator u$_{am,r}$ within the product-sum operation circuitry 1*a* receives two 1-bit inputs, namely, 1-bit data w$_{m,t}$ and 1-bit data x$_{t,r}$. The AND logic gate 21 provides a 1-bit output, namely, an AND logic value based on the data w$_{m,t}$ and x$_{t,r}$.

The adder 12 receives a 1-bit input, which is the 1-bit output data from the AND logic gate 21. The other input to the adder 12 consists of multiple bits from the register 13. That is, a time t-1 multibit value in the register 13 is input to the adder 12. The adder 12 provides multibit output data that corresponds to a sum of the 1-bit output data from the AND logic gate 21 and the time t-1 multibit value in the register 13.

The register 13 receives a multibit input. That is, the register 13 retains the multibit output data from the adder 12, which has been obtained at the adder 12 by addition of the 1-bit output data given from the AND logic gate 21 at time t. The values at time T (cycles) in the respective registers 13 in the arithmetic operators ua$_{m,r}$ of the product-sum operation circuitry 1*a* are output to the post-processing circuitry 3.

It should be noted that the output from each arithmetic operator ua$_{m,r}$ in the second exemplary product-sum operation circuitry 1*a* is supplied to the processor 5 without post-processing.

Also, the AND logic gates 21 have been adopted on the assumption that the 1-bit data items w$_{m,t}$ and x$_{t,r}$ are expressed as "(1,0)". If the data items w$_{m,t}$ and x$_{t,r}$ are expressed as "(+1, −1)", the AND logic gates 21 are replaced by XNOR logic gates.

Each arithmetic operator ua$_{m,r}$ may include the AND logic gate 21, an XNOR logic gate (not shown), and a selection circuit (not shown) that is adapted to select the AND logic gate 21 or the XNOR logic gate according to the setting value of the register.

Moreover, while the accumulator of a 1-bit input type may be constituted by the adder 12 and the register 13 as shown in FIG. 13, an asynchronous counter may also be used.

2-3 Third Exemplary Product-Sum Operation Circuitry (Multibit Case 1: Product-Sum Operation Circuitry when Input Data w$_{m,t}$ and x$_{t,r}$ are 3 Bits)

Figure 4:
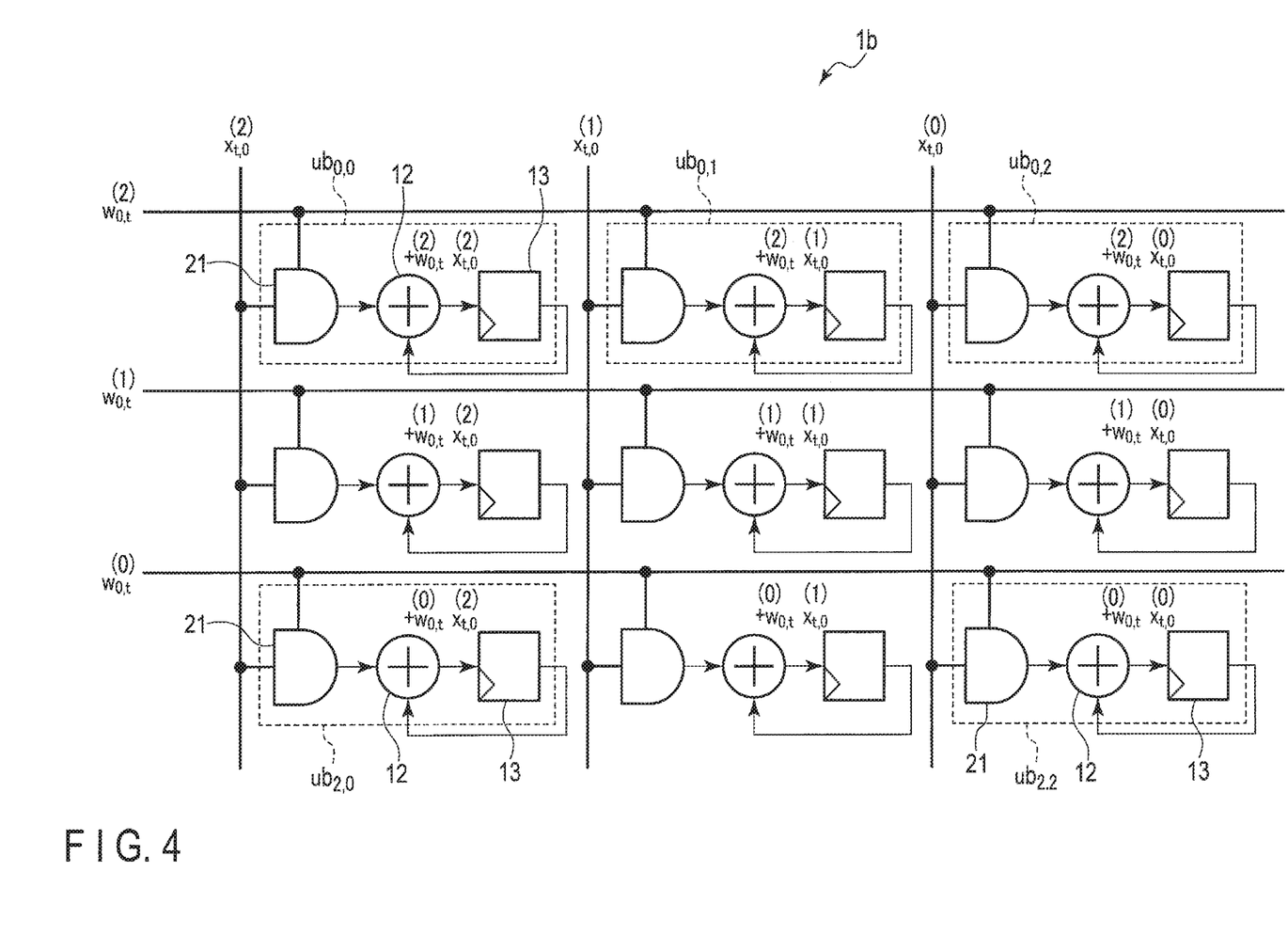
FIG. 4 is a diagram showing third exemplary product-sum operation circuitry for the semiconductor device according to the embodiment.

FIG. 4 shows third exemplary product-sum operation circuitry 1*b* for the semiconductor device 100 according to the embodiment. It embraces the case where each of the input data w$_{m,t}$ and x$_{t,r}$ is 3-bit data. The configurations of the arithmetic operators ub$_{0,0}$ to ub$_{2,2}$ are the same as those of the arithmetic operators ua in FIG. 3.

As shown in FIG. 4, in the product-sum operation circuitry 1*b* where the 3-bit data w$_{0,t}$ and X$_{t,0}$, are input, the value at the 0th bit (LSB) of the data w$_{0,t}$ is input to a data line for the data w$_{0,t}^{(0)}$, the value at the 1st bit of the data w$_{0,t}$ is input to a data line for the data w$_{0,t}^{(1)}$, and the value at the 2nd bit (MSB) of the data w$_{0,t}$ is input to a data line for the data w$_{0,t}^{(2)}$.

Also, the value at the 0th bit (LSB) of the data x$_{t,0}$ is input to a data line for the data x$_{t,0}^{(0)}$, the value at the 1st bit of the data x$_{t,0}$ is input to a data line for the data x$_{t,0}^{(1)}$, and the value at the 2nd bit (MSB) of the data x$_{t,0}$ is input to a data line for the data x$_{t,0}^{(2)}$.

For example, if the data w$_{0,t}$ is 3-bit data expressed as "011b" at time t, "1" is input to the data line for the data w$_{0,t}^{(0)}$, "1" is input to the data line for the data w$_{0,t}^{(1)}$, and "0" is input to the data line for the data w$_{0,t}^{(2)}$.

Also, if the data x$_{t,0}$ is 3-bit data expressed as "110$_b$," at the time t, "0" is input to the data line for the data x$_{t,0}^{(0)}$, "1" is input to the data line for the data x$_{t,0}^{(1)}$, and "1" is input to the data line for the data w$_{t,0}^{(2)}$.

That is, when the data w$_{m,t}$ and x$_{t,r}$ are each 3-bit data, they may be expressed as below. Here, however, the description will focus only on one element of the output, and will omit the indices m and r as used in the foregoing descriptions. The values of w$_t^{(2)}$, etc., are all 1-bit values (0 or 1).

$$w_t = w_t^{(2)} \times 2^2 + w_t^{(1)} \times 2^1 + w_t^{(0)} \times 2^0 \quad (3)$$

$$x_t = x_t^{(2)} \times 2^2 + x_t^{(1)} \times 2^1 + x_t^{(0)} \times 2^0 \quad (4)$$

Figure 9:
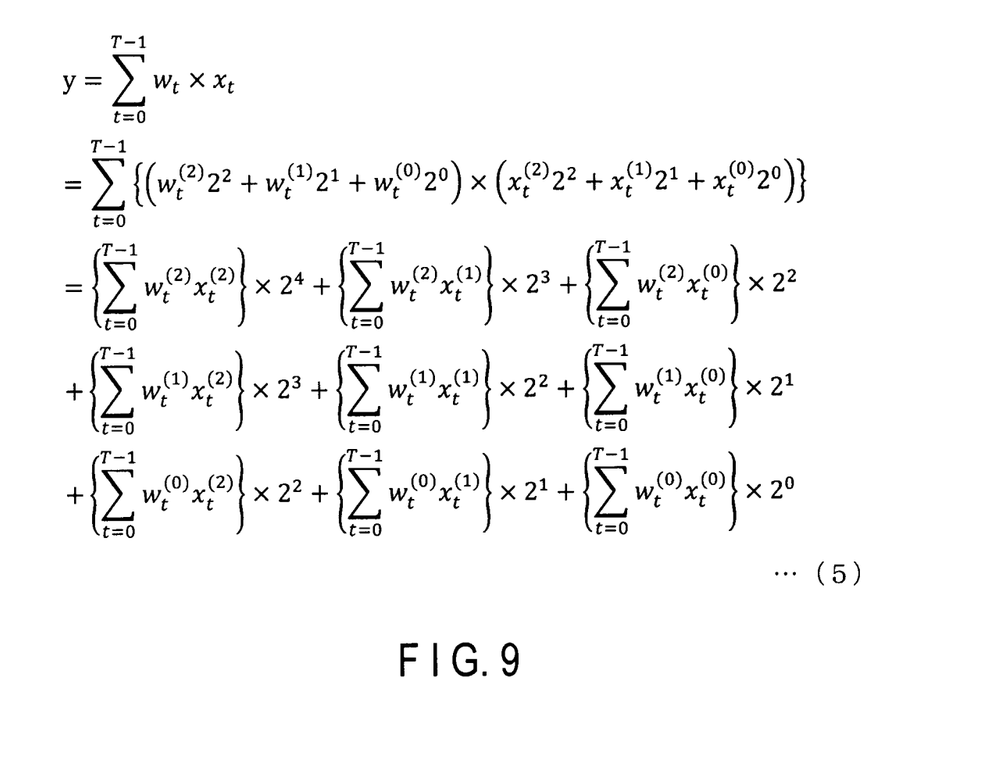
FIG. 9 is an expression calculated by the product-sum operation circuitry.

In this instance, the expression (1) becomes an expression (5) as shown in FIG. 9.

Looking at the expression (5), the first horizontally-given three sigmas use w$_{(t)}^{(2)}$, the second horizontally-given three sigmas use w$_{(t)}^{(1)}$, and the third horizontally-given three sigmas use w$_{(t)}^{(0)}$. Also, the first vertically-given three sigmas use x$_{(t)}^{(2)}$, the second vertically-given three sigmas use x$_{(t)}^{(1)}$, and the third vertically-given three sigmas use x$_{(t)}^{(0)}$. As such, the configurations of the arithmetic operators ub$_{0,0}$ to ub$_{2,2}$ shown in FIG. 4 correspond to the operations of the respective sigma terms in the expression (5).

The output of each of the arithmetic operators ub$_{0,0}$ to ub$_{2,2}$ is supplied to the post-processing circuitry 3. In the post-processing circuitry 3, a final result of the multibit product-sum operation is obtained by multiplying the sigmas by their respective corresponding power-of-two coefficients and summing them. The processing of the power-of-two coefficient multiplications in the post-processing circuitry 3 may be easily performed through shift operations.

In many instances, including instances with deep neural networks, T is a relatively large value that exceeds 100. Accordingly, the processing of multiplying the 1-bit results of the product-sum operations of sigma terms by respective power-of-two coefficients and summing the sigmas in the end (that is, the post-processing) is not so frequently performed. The way in which the post-processing is performed may be discretionarily selected. For example, it may be performed in a sequential manner.

Dealing with Negatives

Assuming that the data values are handled in two's complement representation, the expressions (3) and (4) are given as follows.

$$w_t = -w_t^{(2)} \times 2^2 + w_t^{(1)} \times 2^1 + w_t^{(0)} \times 2^0 \quad (3')$$

$$x_t = -x_t^{(2)} \times 2^2 + x_t^{(1)} \times 2^1 + x_t^{(0)} \times 2^0 \quad (4')$$

Figure 10:
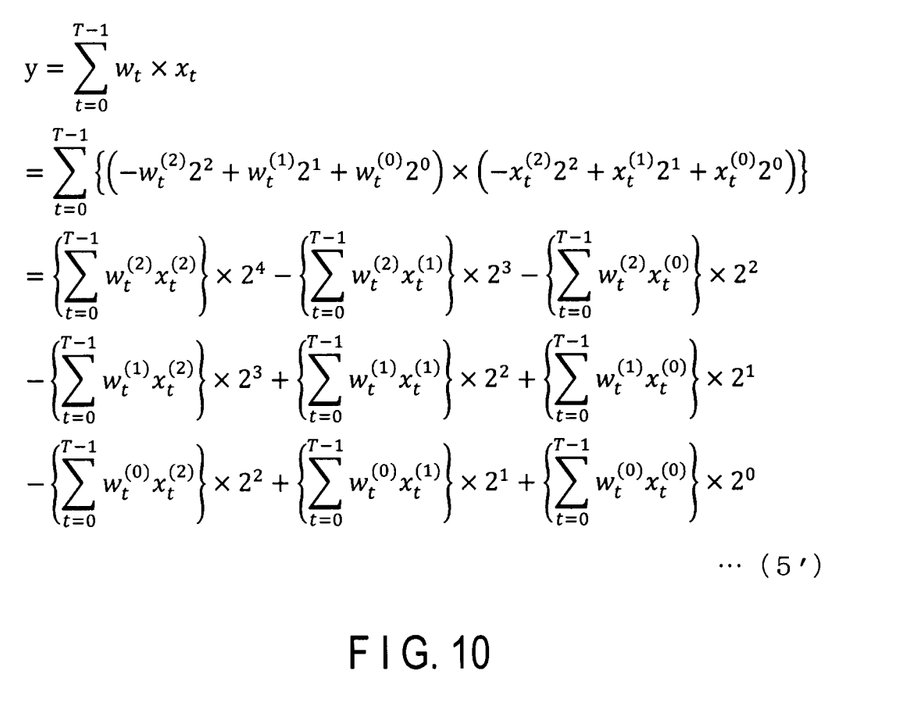
FIG. 10 is an expression calculated by the product-sum operation circuitry.

In this instance, the expression (5) becomes an expression (5') as shown in FIG. 10.

That is, it is sufficient to change the coefficient to negative at the post-processing in the post-processing circuitry 3, and therefore, the configurations similar to FIG. 4 may be utilized.

2-4 Fourth Exemplary Product-Sum Operation Circuitry (Multibit Case 2: Product-Sum Operation Circuitry when Input Data w$_{m,t}$ Involves Different Bits and x$_{t,r}$ is 4 Bits)

Next, fourth exemplary product-sum operation circuitry will be described.

The fourth exemplary product-sum operation circuitry adopts a configuration of a 16×16-operator array.

The description will assume that input data X is a matrix of 32 rows and 4 columns, in which every element is expressed by 4 bits. Input data W is assumed to be a matrix of 15 rows and 32 columns, in which the bit widths of the respective rows are {1, 2, 4, 2, 2, 1, 2, 3, 2, 2, 3, 2, 1, 3, 2};

that is, in this example, the 32 elements on the 0th row are each 1 bit, the 32 elements on the 1st row are each 2 bits, the 32 elements on the 2nd row are each 4 bits, the 32 elements on the 3rd row are each 2 bits, and so on.

The matrix product Y=WX will be a matrix of 15 rows and 4 columns. FIGS. 5A and 5B show how the values in the input data W and X are each input to the operator array. Symbols $u_{0,0}$ to $u_{15,15}$ in these figures each represent one arithmetic operator. An "$x_{t,r}^{(b)}$" refers to the b-th bit value at the t-th row and the r-th column in the data X, and a "$w_{m,t}^{(b)}$" refers to the b-th bit value at the m-th row and the t-th column in the data W. Thus, t being 0 corresponds to the 0th row in X and the 0th column in W, and t being 31 corresponds to the 31st row in X and the 31st column in W.

As shown in FIG. 5A, X having 4 columns x 4 bits is just accommodated in 16 columns of the arithmetic operators, but W uses up 16 rows of the arithmetic operators u upon the 2nd and 1st bits of its 7th row. Accordingly, calculations for the remaining rows in W, including the 0th bit of the 7th row, will be performed later.

The value of t is initially 0, and incremented by one for each cycle until it reaches 31. For example, assuming that $y(u_{m,r})$ is the accumulator's output from an arithmetic operator $u_{m,r}$, the values of $y(u_{0,0})$ to $y(u_{0,3})$ included in $y_{0,0}$ after 32 cycles are given by the following expressions (6).

$$y(u_{0,0})=\Sigma_{t=0}^{31}w_{0,t}^{(0)}x_{t,0}^{(3)}$$

$$y(u_{0,1})=\Sigma_{t=0}^{31}w_{0,t}^{(0)}x_{t,0}^{(2)}$$

$$y(u_{0,2})=\Sigma_{t=0}^{31}w_{0,t}^{(0)}x_{t,0}^{(1)}$$

$$y(u_{0,3})=\Sigma_{t=0}^{31}w_{0,t}^{(0)}x_{t,0}^{(0)} \quad (6)$$

By performing the following operation on them in the post-processing circuitry 3, $y_{0,0}$ can be obtained.

$$y_{0,0}=2^3 \times y(u_{0,0})+2^2 \times y(u_{0,1})+2^1 \times y(u_{0,2})+2^0 \times y(u_{0,3})$$

Similarly, the values of $y(u_{1,0})$ to $y(u_{2,3})$ included in $y_{1,0}$ after 32 cycles are given by the following expressions (7).

$$y(u_{1,0})=\Sigma_{t=0}^{31}w_{1,t}^{(1)}x_{t,0}^{(3)}$$

$$y(u_{1,1})=\Sigma_{t=0}^{31}w_{1,t}^{(1)}x_{t,0}^{(2)}$$

$$y(u_{1,2})=\Sigma_{t=0}^{31}w_{1,t}^{(1)}x_{t,0}^{(1)}$$

$$y(u_{1,3})=\Sigma_{t=0}^{31}w_{1,t}^{(1)}x_{t,0}^{(0)}$$

$$y(u_{2,0})=\Sigma_{t=0}^{31}w_{1,t}^{(0)}x_{t,0}^{(3)}$$

$$y(u_{2,1})=\Sigma_{t=0}^{31}w_{1,t}^{(0)}x_{t,0}^{(2)}$$

$$y(u_{2,2})=\Sigma_{t=0}^{31}w_{1,t}^{(0)}x_{t,0}^{(1)}$$

$$y(u_{2,3})=\Sigma_{t=0}^{31}w_{1,t}^{(0)}x_{t,0}^{(0)} \quad (7)$$

Using these, $y_{1,0}$ can be calculated as follows.

$$y_{1,0}=2^4 \times y(u_{1,0})+2^3 \times y(u_{1,1})+2^2 \times y(u_{1,2})+2^1 \times y(u_{1,3})+2^3 \times y(u_{2,0})+2^2 \times y(u_{2,1})+2^1 \times y(u_{2,2})+2^0 \times y(u_{2,3}) \quad (8)$$

As such, applicable values of the coefficients (powers of two), as well as correspondences (indexes) to the output elements are different for the respective results from the arithmetic operators $u_{m,r}$. For example, the coefficient values and the output indexes may be set as follows.

$y(u_{0,0})$:coefficient=$2^3$,output index=(0,0)

$y(u_{0,1})$:coefficient=$2^2$,output index=(0,0)

$y(u_{0,2})$:coefficient=$2^1$,output index=(0,0)

$y(u_{0,3})$:coefficient=$2^0$,output index=(0,0)

$y(u_{1,0})$:coefficient=$2^4$,output index=(1,0)

$y(u_{1,1})$:coefficient=$2^3$,output index=(1,0)

$y(u_{1,2})$:coefficient=$2^2$,output index=(1,0)

$y(u_{1,3})$:coefficient=$2^1$,output index=(1,0)

$y(u_{1,0})$:coefficient=$2^0$,output index=(1,0)

$y(u_{1,1})$:coefficient=$2^2$,output index=(1,0)

$y(u_{1,2})$:coefficient=$2^1$,output index=(1,0)

$y(u_{1,3})$:coefficient=$2^0$,output index=(1,0)   (9)

Figure 6:
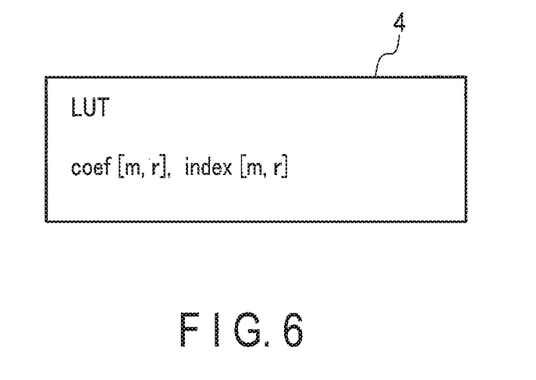

Thus, the embodiment adopts the LUT 4 that stores coefficients and output indexes addressed to "m,r". FIG. 6 shows the LUT 4.

As shown in FIG. 6, the LUT 4 stores items, coef[m,r] and index[m,r]. The item, coef[m,r], is a coefficient to multiply the output $y(u_{m,r})$ of the arithmetic operator $u_{m,r}$ that is positioned at an m-th row and an r-th column. The item, index[m,r], is an output index to put to the output $y(u_{m,r})$ of the arithmetic operator $u_{m,r}$.

Turning back to FIG. 5A, one operation by one set of the arithmetic operators u can only cover the calculations up to the higher two bits of the three bits in $w_{7,t}$. The coefficients and the output indexes corresponding to $y(u_{14,0})$ to $y(u_{15,3})$, which are part of the higher two bits and included in the $y_{7,0}$, are as follows.

$y(u_{14,0})$:coefficient=$2^5$,output index=(7,0)

$y(u_{14,1})$:coefficient=$2^4$,output index=(7,0)

$y(u_{14,2})$:coefficient=$2^3$,output index=(7,0)

$y(u_{14,3})$:coefficient=$2^2$,output index=(7,0)

$y(u_{15,0})$:coefficient=$2^4$,output index=(7,0)

$y(u_{15,1})$:coefficient=$2^3$,output index=(7,0)

$y(u_{15,2})$:coefficient=$2^2$,output index=(7,0)

$y(u_{15,3})$:coefficient=$2^1$,output index=(7,0)   (10)

Therefore, $y_{7,0}$ has a value given by the following.

$$y_{7,0}=2^5 \times y(u_{14,0})+2^4 \times y(u_{14,1})+2^3 \times y(u_{14,2})+2^2 \times y(u_{14,3})+2^4 \times y(u_{15,0})+2^3 \times y(u_{15,1})+2^2 \times y(u_{15,2})+2^1 \times y(u_{15,3}) \quad (11)$$

The remaining 1 bit is handled after the completion of the operation shown in FIG. 5A, and now the data w shown in FIG. 5B is input to the arithmetic operators $u_{0,0}$ to $u_{15,15}$. In this example, x is the same as x shown in FIG. 5A. The coefficients and the output indexes corresponding to $y(u_{0,0})$ to $y(u_{0,3})$, namely, remaining 1 bit of $y_{7,0}$, are as follows.

$y(u_{0,0})$:coefficient=$2^3$,output index=(7,0)

$y(u_{0,1})$:coefficient=$2^2$,output index=(7,0)

$y(u_{0,2})$:coefficient=$2^1$,output index=(7,0)

$y(u_{0,3})$:coefficient=$2^0$,output index=(7,0)

The post-processing with these values, according to the algorithm based on the coefficients and the output indexes, will give the following expression (12) incorporating the expression (11).

$$\begin{aligned}y_{7,0} = &2^5 \times y(u_{14,0}) + 2^4 \times y(u_{14,1}) + 2^3 \times y(u_{14,2}) + 2^2 \times y\\&(u_{14,3}) + 2^4 \times y(u_{15,0}) + 2^3 \times y(u_{15,1}) + 2^2 \times y(u_{15,2}) + 2^1 \times\\&y(u_{15,3}) + 2^3 \times y(u_{0,0}) + 2^2 \times y(u_{0,1}) + 2^1 \times y(u_{0,2}) + 2^0 \times y\\&(u_{0,3})\end{aligned} \quad (12)$$

This completes the calculation for $y_{7,0}$, which was incomplete at the processing shown in FIG. 5A.

Figure 7:
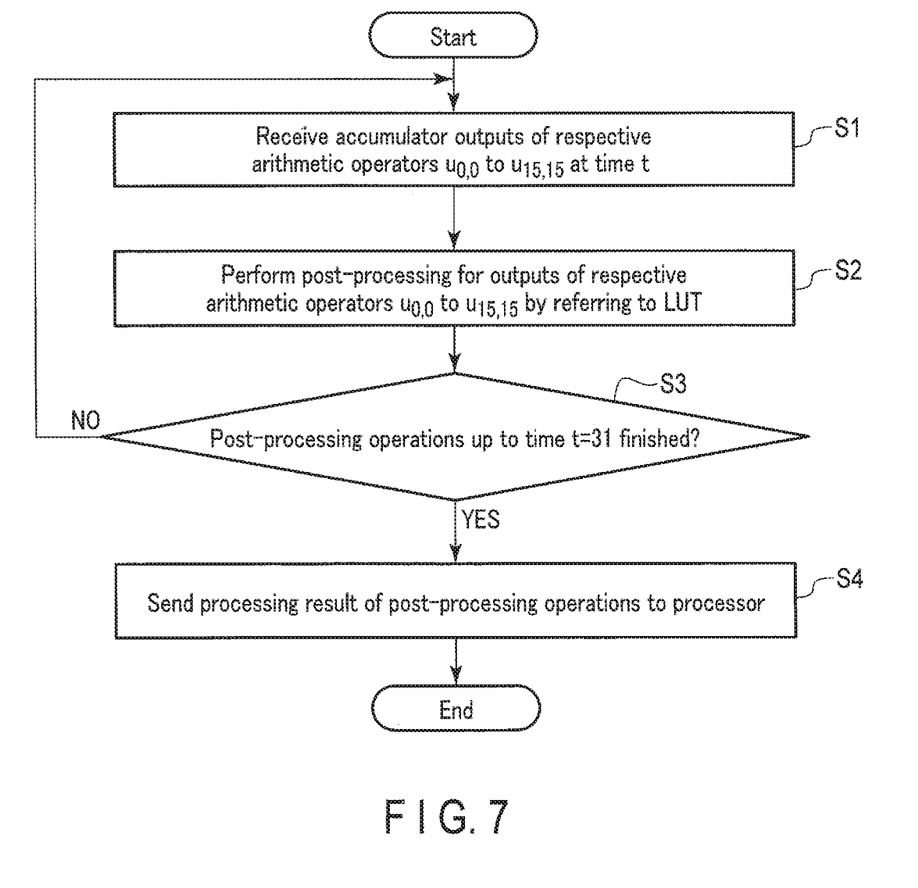
FIG. 7 is a flowchart for explaining a post-processing operation for fourth exemplary product-sum operation circuitry.

FIG. 7 is a flowchart for explaining the post-processing operation for the fourth exemplary product-sum operation circuitry.

As shown in FIG. 7, the post-processing circuitry 3 receives an output at time t (t=0 at the start) of the accumulator in each arithmetic operator $u_{m,r}$ (step S1). The post-processing circuitry 3 performs the post-processing of multiplying the output $y(u_{m,r})$ of each arithmetic operator $u_{m,r}$ by the corresponding coefficient stored in the LUT 4 and putting the output index to it (step S2).

It is then determined whether or not all the post-processing operations for the accumulator outputs from the arithmetic operators $u_{0,0}$ to $u_{15,15}$, up to time t=31, have been finished (step S3). If it is determined that all the post-processing operations have not yet been finished (NO in step S3), the post-processing circuitry 3 returns to step S1 and performs the remaining post-processing operations for the accumulator outputs from the arithmetic operators $u_{0,0}$ to $u_{15,15}$, for the time t=1 and onward.

On the other hand, if it is determined in step S3 that all the post-processing operations for the accumulator outputs from the arithmetic operators $u_{0,0}$ to $u_{15,15}$ up to time t=31 have been finished (YES in step S3), the post-processing circuitry 3 sends the result of the post-processing operations to the processor 5 (step S4), and terminates the processing.

3 Effects of Semiconductor Device

With the configuration of the product-sum operation circuitry 1 for the semiconductor device 100 according to the embodiments, it is possible to reduce the data transfers from the memory, such as an SRAM, to the operator array of the product-sum operation circuitry 1. Consequently, the data processing by the semiconductor device 100 can be realized with an improved efficiency.

In the example shown in FIG. 2, the total number of times of the product-sum operations is M×R×T. Supposing that the device has one arithmetic operator, then 2×M×R×T data transfers are required in total, since two data items need to be transferred from the memory to the arithmetic operator each time the product-sum operation is performed. In the configuration according to the embodiment shown in FIG. 2, the data lines for data $w_{m,t}$ and $x_{t,r}$ are arranged to be common to the arithmetic operators $u_{0,0}$ to $u_{M-1,R-1}$ for each row and column; therefore, the data transfers are given as (M+R)×T. For example, if M=R, the data transfers of the embodiment are given as $\{(M+R) \times T\}/\{2 \times M \times R \times T\}=1/M$, in contrast to the cases where the configuration of FIG. 2 is not adopted.

With the semiconductor device 100 according to the embodiments in the third and fourth exemplary multibit cases, suitable coefficients and output indexes are set in the LUT 4 in accordance with the bit widths of the input data X and W, and the post-processing algorithms are applied as discussed above. Thus, the data X and W can be processed even when they are of various bit numbers differing from each other.

Also, the embodiments can duly deal with the instances where one value must be segmented, as the value $y_7$ in the fourth exemplary case. The embodiments as such can make full use of the operator array without idle resources, and this contributes to the improved efficiency and the accelerated processing speed of the arithmetic operators.

For example, a semiconductor device that adopts parallel operations of multiple 1-bit arithmetic operators is not capable of coping with the demand for an accuracy level of 2 or more bits. In contrast, the 1 bit×1 bit product-sum operations in the third and fourth exemplary cases of the embodiments enable comparably high-speed processing while being capable of coping with multibit inputs.

The embodiments further contrast with multibit×multibit-dedicated circuitry (e.g., GPU). Note that when arithmetic operators are each adapted for multibit×multibit operations, the circuit size of one arithmetic operator is larger than an arithmetic operator for 1 bit×1 bit operations.

Provided that the same parallel number and the same processing time for one operation of arithmetic operators are set, the product-sum operation circuitry in the third and fourth exemplary cases of the embodiments has a smaller circuit size for performing 1 bit×1 bit product-sum operations while having the same processing speed.

In other words, using multibit×multibit-dedicated arithmetic operators for performing 1 bit×1 bit operations involves idle circuits. This means that resources are largely wasted and efficiency is sacrificed.

For example, when there are 16×16 arithmetic operators, 16×16=256 parallel operations can be performed as 1 bit×1 bit product-sum operations. Using the same configuration, (16/4)×(16/4)=16 parallel operations can be performed as 4 bits×4 bits product-sum operations. Also, the two matrices do not need to have the same bit widths, and it is possible to perform, for example, (16/2)×(16/8)=16 parallel operations as 2 bits×8 bits product-sum operations.

The third and fourth exemplary cases of the embodiments eliminate the idle resources as noted above by efficiently allowing all the arithmetic operators to be used irrespective of the bit widths of input data. In the instances of multibit×multibit product-sum operations, still, the embodiments require multiple arithmetic operators to deal with a calculation that is performed by one multibit×multibit-dedicated arithmetic operator. Thus, on the condition that the same parallel number is set, the product-sum operation circuitry in the third and fourth exemplary cases of the embodiments—which may be hypothesized to have a smaller parallel number on an equivalent basis—operates at a relatively low processing speed as compared to the circuitry of multibit×multibit-dedicated arithmetic operators.

However, the embodiments can have a smaller circuit size for one arithmetic operator as compared to a multibit×multibit-dedicated arithmetic operator. Accordingly, the embodiments can have a larger parallel number for arithmetic operators when the size of the entire circuitry is the same.

Ultimately, the embodiments provide a higher processing speed when the bit widths of input data are small, while providing a lower processing speed when the bit widths of input data are large. Despite this, in most instances (for example, in the processing for deep learning where the desired bit widths of input data can vary depending on layer) small bit widths are sufficient and large bit widths are only required for a limited part. Therefore, assuming the instances where the operations using input data with small bit widths account for a larger part, the semiconductor device 100 according to the embodiments provide a higher processing speed as a whole.

While certain embodiments have been described, they have been presented by way of example only, and they are not intended to limit the scope of the inventions. Indeed, the novel embodiments described herein may be worked in a variety of other forms. Furthermore, various omissions, substitutions, and changes in such forms of the embodiments may be made without departing from the gist of the inventions. The embodiments and their modifications are covered by the accompanying claims and their equivalents, as would fall within the scope and gist of the inventions.

What is claimed is:

1. A semiconductor device comprising:
a plurality of operation circuits each comprising
a first input terminal,
a second input terminal,
a multiplier configured to calculate a product of a value input via the first input terminal and a value input via the second input terminal, and
an accumulator configured to accumulate an output of the multiplier and output an accumulated value that is obtained by integrating output values of the multiplier,
wherein the plurality of operation circuits are arrayed in a two-dimension manner of a plurality of rows and a plurality of columns,
wherein at least one operation circuit in multiple operation circuits on each row is configured to receive, via respective one of the first input terminals, a first number of bit data that is smaller than a first input data, and
at least one operation circuit in multiple operation circuits on each column is configured to receive, via respective one of the second input terminals, a second number of bit data that is smaller than a second input data, and wherein
the semiconductor device further comprises processing circuitry configured to obtain a product-sum operation result by multiplying outputs from the accumulators in each of the operation circuits by respective coefficients and summing the multiplied outputs.

2. The semiconductor device according to claim 1, wherein the first value and the second value are each 1 bit, and the multiplier comprises an AND logic gate.

3. The semiconductor device according to claim 1, wherein the accumulator comprises an asynchronous counter.

4. The semiconductor device according to claim 1, wherein the first value and the second value are each 1 bit, and the multiplier comprises an XNOR logic gate.

5. The semiconductor device according to claim 1, wherein the first value and the second value are each 1 bit, and the multiplier comprises an AND logic gate, an XNOR logic gate, and a selection circuit configured to select the AND logic gate or the XNOR logic gate.

6. The semiconductor device according to claim 1, further comprising storage circuitry configured to store, for the respective operation circuits, the coefficients for the outputs from the accumulators, and index values, wherein the processing circuitry is configured to refer to the storage circuitry and put the index values that correspond to the operation circuits to the obtained product-sum operation result.

7. A memory system comprising:
a memory;
product-sum operation circuitry configured to perform a product-sum operation using first data and second data read from the memory, the first data and the second data each expressed in a matrix form, and the product-sum operation circuitry comprising a first input terminal and a second input terminal; and
a processor configured to receive a result of the product-sum operation from the product-sum operation circuitry,
wherein the product-sum operation circuitry comprises a plurality of operation circuits each comprising
a multiplier configured to calculate a product of a value input via the first input terminal and a value input via the second input terminal, and
an accumulator configured to accumulate an output of the multiplier and output an accumulated value that is obtained by integrating output values of the multiplier, and
wherein the product-sum operation circuitry is arrayed in a two-dimensional manner of a plurality of rows and a plurality of columns,
wherein the product-sum operation circuitry on each row is configured to receive, via the first input terminal, a first number of bit data that is smaller than a first input data,
wherein the product-sum operation circuitry on each column is configured to receive, via the second input terminal, a second number of bit data that is smaller than a second input data, and wherein
the semiconductor device further comprises processing circuitry configured to obtain a product-sum operation result by multiplying an output of the accumulator in the product-sum operation circuitry by a coefficient and summing the multiplied output.

8. The memory system according to claim 7, wherein the first value and the second value are each 1 bit, and the multiplier comprises an AND logic gate.

9. The memory system according to claim 7, wherein the accumulator comprises an asynchronous counter.

10. The memory system according to claim 7, wherein the first value and the second value are each 1 bit, and the multiplier comprises an XNOR logic gate.

11. The memory system according to claim 7, wherein the first value and the second value are each 1 bit, and the multiplier comprises an AND logic gate, an XNOR logic gate, and a selection circuit configured to select the AND logic gate or the XNOR logic gate.

12. The memory system according to claim 7, further comprising storage circuitry configured to store, for the respective operation circuits, the coefficients for the outputs from the accumulators, and index values, wherein the processing circuitry is configured to refer to the storage circuitry and put the index values that correspond to the operation circuits to the obtained product-sum operation result.

* * * * *